United States Patent [19]

Petersen et al.

[11] Patent Number: 4,566,272
[45] Date of Patent: Jan. 28, 1986

[54] HYDRAULIC CONTROL APPARATUS FOR A SERVO-MOTOR, PARTICULARLY FOR VEHICLE STEERING

[75] Inventors: Hans C. Petersen, Nordborg; Erik Kyster, Augustenborg, both of Denmark

[73] Assignee: Danfoss A/S, Nordborg, Denmark

[21] Appl. No.: 559,301

[22] Filed: Dec. 8, 1983

[30] Foreign Application Priority Data

Dec. 30, 1982 [DE] Fed. Rep. of Germany ....... 3248638

[51] Int. Cl.[4] .............................................. F01C 1/10
[52] U.S. Cl. .................................. 60/384; 137/625.21; 418/61 B; 418/185
[58] Field of Search ................ 418/61 B, 185; 60/384; 137/625.21; 251/283

[56] References Cited

U.S. PATENT DOCUMENTS

| | | | |
|---|---|---|---|
| Re. 31,067 | 10/1982 | Roberts | 418/61 B |
| 3,438,200 | 4/1969 | Jennings et al. | 418/61 B X |
| 3,446,021 | 5/1969 | Lech | 418/61 B X |
| 4,232,708 | 11/1980 | Miller | 418/61 B X |
| 4,251,194 | 2/1981 | Petersen | 418/61 B |
| 4,266,464 | 5/1981 | Baatrap et al. | 60/384 X |
| 4,356,759 | 11/1982 | Ljubimov et al. | 60/384 X |
| 4,364,302 | 12/1982 | Thomsen et al. | 60/384 X |

Primary Examiner—John J. Vrablik
Assistant Examiner—Theodore W. Olds
Attorney, Agent, or Firm—Wayne B. Easton

[57] ABSTRACT

The invention relates to a hydrostatic steering control unit of the type having a metering motor for supplying metered pressurized fluid to external servomotor. The unit has a throttled controlled passage which bypasses the metering motor and has a flow therethrough which has a definite relationship to the flow through the metering motor. In this way a comparatively large amount of pressure fluid can be supplied to the servomotor even though the flow capacity of the metering motor is much smaller.

8 Claims, 6 Drawing Figures

HYDRAULIC CONTROL APPARATUS FOR A SERVO-MOTOR, PARTICULARLY FOR VEHICLE STEERING

The parent Pat. No. 32 01 794 relates to a hydraulic control apparatus for a servo-motor, particularly for vehicle steering, comprising a preferably directionally dependently operative quantity setting apparatus having between a pump connection and the respective servo-motor connection a metering motor in series with a supply throttle adjustable by an actuating element and the metering motor, the pump connection and respective servo-motor connection being additionally connected by a bypass path having a bypass throttle connected to and adjustable with the supply throttle in series with a pressure regulating apparatus which maintains the pressure drop at the amplifier throttle equal to the pressure drop at the supply throttle.

Since the cross-section of the opening in the bypass throttle depends on the actuating element and the metering motor, as does that of the supply throttle, and the pressure drop at both throttles is kept equal, the amount of flow through the bypass path has a clear relationship to the amount flowing through the metering motor. In particular, it is accurately proportional to the amount of flow. In this way, a comparatively large amount of pressure fluid can be supplied to the servo-motor depending on the actuating element, even though the through-flow capacity of the metering motor is much smaller.

A hydraulic control apparatus is already known (DE-PS No. 30 36 797) in which the quantity setting apparatus has a motor housing in an outer housing. The motor housing is rotatable relatively thereto about an angle defined by rotation limiting means against the force of neutral position springs and it comprises a track carrier of the metering motor. Radial pistons co-operate therewith; they are guided in a rotor which, by way of control shaft, is fixed to rotate with the actuating element. To form the supply throttle, first control orifices at the inner circumference of the outer housing co-operate with second control orifices at the outer circumference of the motor housing. This gives the advantage that, to form a directional valve comprising the supply throttle, fixed control orifices co-operate with control orifices which are adjustable through only a limited distance.

The invention is based on the problem of providing a control apparatus of the aforementioned kind which is of particularly simple construction.

This problem is solved according to the invention in that the quantity setting apparatus comprises in an outer housing a first motor part of the metering motor which is rotatable relatively thereto through an angle defined by rotation limiting means against the force of neutral position springs and which comprises a second motor part connected by way of a control shaft to rotate with the actuating element, that the supply throttle is formed by the co-operation of at least one control orifice at the outer housing and at least one control orifice at a valve element fixed to rotate with the first motor part, and that a rotary slide is fixed to rotate with the valve element and the bypass throttle is formed by the co-operation of at least one control orifice at the outer housing with at least one control orifice at the rotary slide.

In this construction, one also obtains for the bypass valve the advantages that fixed control orifices co-operate with control orifices that are rotatable only through a limited distance. The movable parts required for the bypass path are therefore reduced to a minimum. The bypass path extends exclusively through the outer housing, with the exception of the rotary slide. There are no difficulties in providing correspondingly large cross-sections to keep the flow resistance low.

Preferably, the first motor part and the valve element belong to motor housing rotatable within limits in the outer housing. By incorporating the valve element in the motor housing, additional connecting means are dispensed with.

It is particularly favourable if the rotary slide is axially offset from the valve element and fixed to rotate therewith by way of an entrainment shaft. The spatial separation of the valve faces for the supply throttle and the bypass throttle permits the bypass path to be designed for comparatively large quantities of pressure fluid and to make the cross-sections of the control orifices of the bypass valve correspondingly large. On the other side, the supply throttle can as usual be incorporated in a directional valve which comprises still further control orifices for which space is then available. Another advantage is that a control apparatus without bypass path can be converted to a control apparatus with bypass path with the aid of very few supplementary parts. Such a modular construction facilitates considerable rationalisation in production and keeping components in stock.

In a preferred embodiment, the control orifices of the supply throttle are disposed in an inner face of the outer housing that is perpendicular to the motor shaft and the adjoining end face of the motor housing. This leads to an axially short valve arrangement and to short paths in the outer housing as well as in the motor housing.

With particular advantage, the control orifices of the bypass throttle are disposed in an inner face of the outer housing that is perpendicular to the motor shaft and the adjoining end face of the disc-shaped rotary slide. The disc-shape of the rotary slide permits the bypass throttle to be so arranged that the outer housing needs to be only slightly lengthened in the axial direction.

In a favourable construction, the rotary slide surrounds the control shaft whereas the entrainment shaft is hollow and the control shaft passes therethrough. This exploits the fact that next to the space receiving the motor housing, the outer housing must have an aperture for the passage of the control shaft. This aperture is then also utilised for the entrainment shaft.

In another embodiment, the outer housing has on the side remote from the control shaft an intermediate wall which has passages and of which one side co-operates with the side of the motor housing to form the supply throttle and the other side co-operates with the side of the disc-shaped rotary slide to form the bypass throttle, the entrainment shaft passing through a central passage in the intermediate wall. This results in prticularly simple hydraulic connections. Also, the central passage through which the entrainment shaft extends can be utilised for the supply and withdrawal of the operating fluid.

It is particularly favourable if the rotary slide is covered on the side remote from the intermediate wall by an end wall carrying the connections at the end. In this way, exceptionally short distances are obtained for the bypass path.

Desirably, the central passage is connected to a container connector of the outer housing. This passage not only forms a return path offering little resistance because of its large cross-section but also serves as a leakage oil collecting passage, at least in the region of the supply throttle and the bypass throttle.

In a further embodiment, the end face of the motor housing and the co-operating inner face of the outer housing each have a central aperture which at least define the four corners of a rectangle and in which there are disposed two supporting plates with a pair of curved leaf springs therebetween to form the rotation limiting means and the neutral position springs, the ends of the leaf spring being in abutment and the entrainment shaft passing therebetween. The entrainment shaft, neutral position springs and rotation limiting means can therefore be accommodated in the least possible space.

It is also favourable if in the disc-shaped rotary slide there is formed between the end faces having the control orifices of the bypass valve a high pressure zone with adjoining throttle gap and between the opposite end faces there is formed an intermediate pressure zone of larger area with an adjoining second throttle gap, the first throttle gap being connected between the high pressure and intermediate pressure zones and the second throttle gap between the intermediate pressure zone and the low pressure zone. In this way, the rotary slide is kept in a position of equilibrium where there is practically no friction. The rotary slide can therefore be very easily adjusted and does not hinder the operation of the quantity setting apparatus.

Preferred examples of the invention will now be described in more detail with reference to the drawing, wherein.

Figure 1:
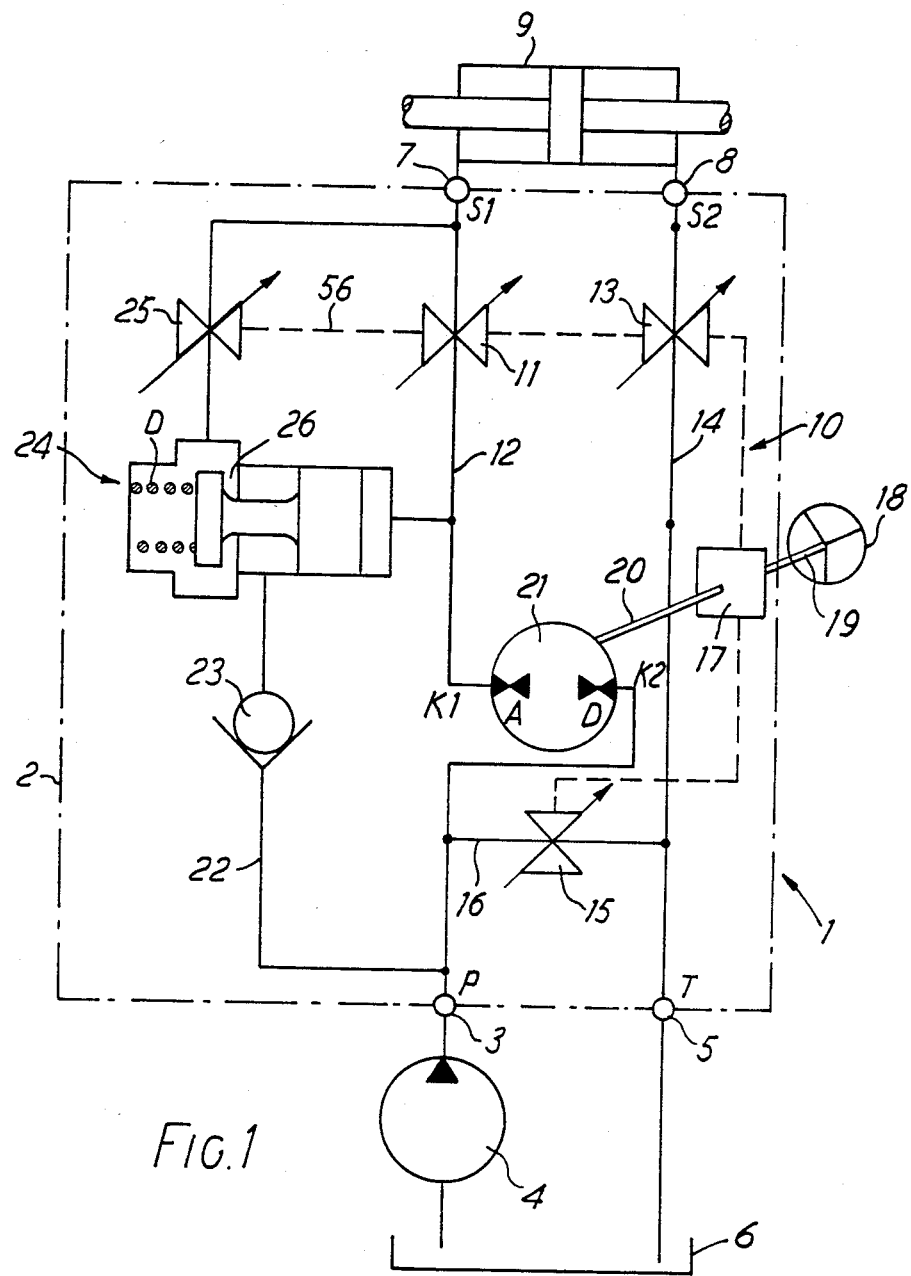
FIG. 1 is a circuit diagram corresponding to the parent patent for the control apparatus according to the invention.
Figure 2:
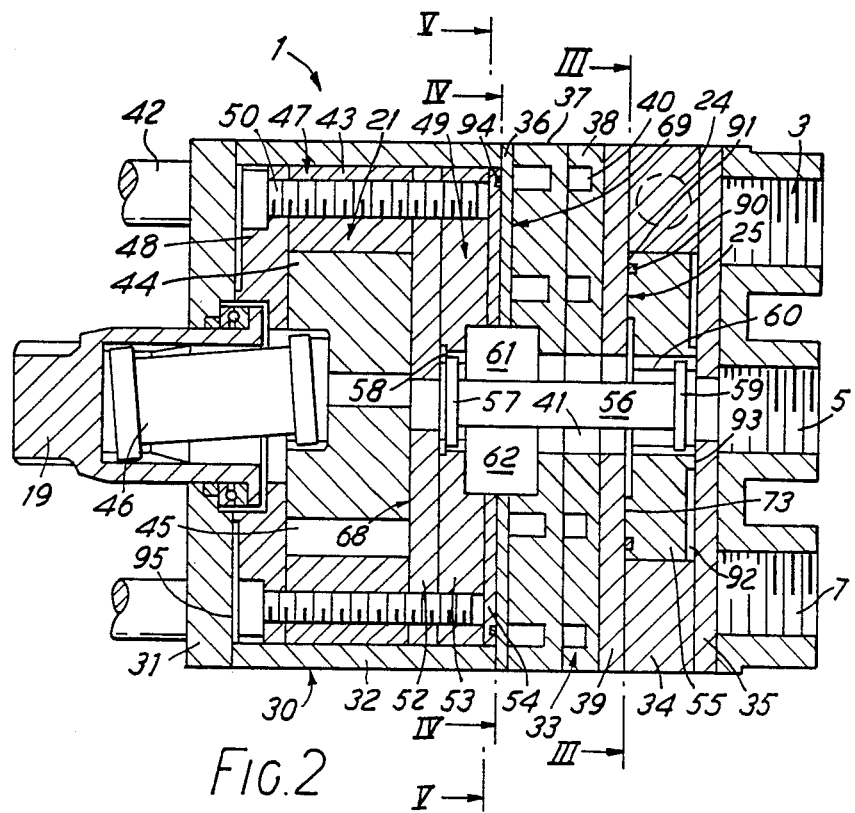
FIG. 2 is a longitudinal section through one embodiment of control apparatus according to the invention.
Figure 3:
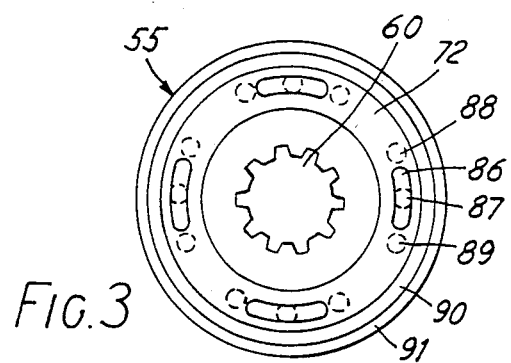
FIG. 3 is an elevation of the rotary slide on the line III—III in FIG. 2.

According to FIG. 1, a control apparatus 1 has a housing 2 with a connection 3 for a pump 4, a connection 5 for a container 6 and two connections 7 and 8 for connecting a servo-motor 9.

In the housing 2 there is a quantity setting apparatus 10 comprising a comparator 17 for adjusting a supply throttle 11 in a supply line 12, a return throttle 13 in a return line 14 and a shunt throttle 15 in a bypass line 16. This comparator is adjustable with the aid of an actuating element 18 in the form of a steering wheel by a metering motor 21 by way of a control shaft 19 and by way of a further connection 20. The supply and return lines may also comprise additional throttles controlled by the comparator 17. In the neutral position of the comparator 17, the shunt throttle 15 is fully open so that pressure fluid flows direct from the pump connection 3 to the container connection 5. Upon rotation of the actuating element 18, the metering motor 21 is connected in the supply line 12 so that the comparator 17 is returned depending on the amount of pressure fluid flowing through the metering motor 21. Upon rotation in the opposite direction, the throttles 11 and 13 have their function as supply and return throttles reversed and the metering motor 21 is again connected into the supply line.

Between the pump connection 3 and the motor connection on the supply side, in this case the motor connection 7, there is a bypass path 22 with a check valve 23, a pressure regulating apparatus 24 and a bypass throttle 25. The bypass throttle 25 is mechanically connected to the throttles 11, 13 and 15. The pressure regulating apparatus 24 has a throttling point 26 which is so controlled that the pressure in front of the bypass throttle 25 is equal to the pressure in front of the supply throttle 11, i.e. the pressure drop at the two throttles is equal. Consequently, there is a clear functional relationship between the amount of pressure fluid in the bypass path 22 and in the supply line 12. In particular, there is proportionality.

FIGS. 2 to 5 show an embodiment of a control apparatus 1 according to the invention. An outer housing 30 comprises an end plate 31, a sleeve 32, an intermediate wall 33, an annular plate 34 and an end wall 35 which carries the connections 3, 5, 7 and 8. The intermediate wall 33 consists of a plurality of plates 36, 37, 38 and 39 which contain connecting passages, for example annular passages 40 and a central passage 41. As is indicated in broken lines, the pressure regulating apparatus 24 is accommodated in the annular plate 34. The screws 42 hold the parts of the outer housing 30 together. The plates of the intermediate wall 33 can be securedly interconnected by soldering, adhesion and the like.

The metering motor 21 comprises a first motor part 43 in the form of an internally toothed gear ring and a second motor part 44 in the form of an externally toothed gear defining compression chambers 45 between each other. The second motor part 44 turns and planetates relative to the first motor part 43. It is connected to the control shaft 19 by a cardan shaft 46 which balances out the planetating motion. The first motor part 43 forms part of a motor housing 47 having an end plate 48 on one side and a passage plate 49 on the other side, these parts being interconnected by screws 50. The passage plate 49 consists of a plurality of discs 52, 53 and 54 which are securely interconnected.

Figure 4:
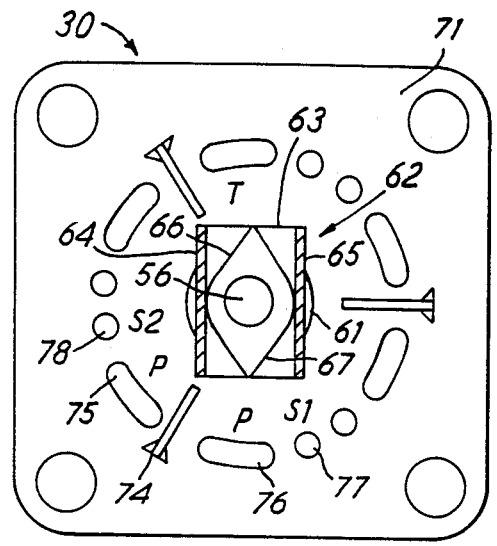
FIG. 4 is an end elevation of the intermediate wall on the line IV—IV in FIG. 2.
Figure 5:
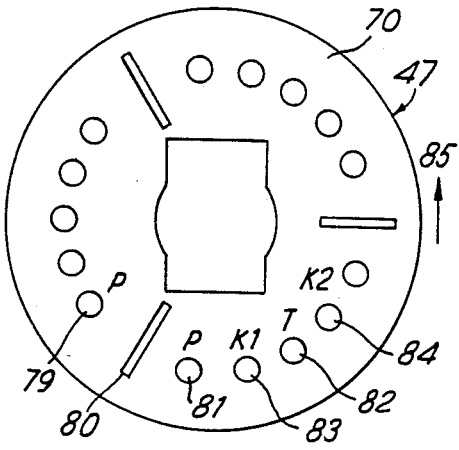
FIG. 5 is an end elevation of the motor housing on the line V—V in FIG. 2.

Within the annular plate 34 there is a disc-shaped rotary slide 55 which is fixed to rotate with the motor housing 47 by way of an entrainment shaft 56. The entrainment shaft has a toothed head 57 engaging in internal teeth 58 of the passage plate 49; it passes through the central passage 41 and, with a toothed head 59, engages in internal teeth 60 of the rotary slide 55. In a central recess 61 of passage plate 49 and intermediate wall 33 there is an arrangement 62 which serves to limit the angle of rotation and comprises the neutral position springs. As is shown in FIG. 4, the recess 61 is shaped so that it defines the four corners of a rectangle 63. In the rest position, two supporting plates 64 and 65 are pressed into the corners by two plate springs 66 and 67 which abut with their ends, whereby the central position of the motor housing 47 is defined. Rotation of the motor housing 47 relatively to the outer housing 30 leads to compression of the leaf springs 66 and 67 which, in the absence of an external force, therefore return the parts to the neutral position.

Throttles or valves are formed in three parallel planes between each two relatively movable parts. Thus, there is a distributing valve 68 formed by control orifices in the one side of the second motor part 44 and by control orifices in the adjoining side of the passage plate 49. Further, there is a directional valve 69 to which the supply throttle 11 also belongs and which is formed by control orifices in the end face 70 of motor housing 47 and by control orifices in the adjoining inner face 71 of the outer housing 30. Finally, there is a bypass throttle 25 which is formed by control orifices in the side 72 of rotary slide 55 and in the adjoining side 73 of the intermediate wall 33.

In the fixed end face 71, three sets of five control orifices each are located on a circular track. One control orifice 74 is connected to the container connection 5 or a connection leading to a further consumer. At both sides there are control orifices 75 and 76 which are connected to the pump connection 3 and therefore designated P. Therebeyond there are two control orifices 77 and 78, one of which is connected to the motor connection 7 for the servo-motor 9 and the other to the motor connection 8, for which reason they carry the references $S_1$ and $S_2$. Accordingly, three sets of six control orifices each are also provided in the end face 70 of motor housing 47. Three of these control orifices 79, 80 and 81 are permanently connected to the pump connection 3 and therefore designated P. A further control orifice 82 is permanently connected to the container connection 5 and therefore designated T. Between the control orifices 81 and 82 there is a control orifice 83 connected to the connection of the metering motor 21 and therefore designated $K_1$. On the other side of control orifice 82 there is a control orifice 84 which is connected to the other connection of the metering motor 21 and therefore designated $K_2$.

In the neutral position, the control orifice 83 is disposed between the control orifices 76 and 77, the control orifice 82 between the control orifices 77 and 78, and the control orifice 84 between the control orifices 78 and 75. If through actuation of the control shaft 19 the rotor 44 and because of the fluid enclosed in the compression chambers 45 also the motor housing 47 are turned in the direction of the arrow 85, one obtains the connection of the metering motor 21 as illustrated in FIG. 1. The control orifices 84 come into registry with the control orifices 75 so that the connection $K_2$ of the metering motor 21 is connected to the pump 4. The control orifices 83 come into registry with control orifices 77 so that the metering motor connection $K_1$ is in communication with the motor connection $S_1$. These two control orifices 75 and 83 form the supply throttle 11. The control orifices 82 come into registry with the control orifices 78 so that, while forming the return throttle 13, the connection is established between the motor connection $S_2$ and the container T. In the opposite direction of rotation, corresponding conditions are obtained.

The rotary slide 55 taken along by the motor housing 47 has four control orifices 86 on its end face 72. The control orifices shown in broken lines are provided in the end face 73 of the intermediate wall 33. Of these, the control orifice 87 is permanently connected to the outlet D of the pressure regulating device 24. The control orifice 88 communicates with the motor connection $S_1$ and the control orifice 89 with the motor connection $S_2$. Consequently, when the motor housing is turned in the direction of the arrow 85, the rotary slide 55 is taken along in the same direction, the bypass throttle 25 being formed by the control orifices 86 and 88. In the opposite direction of rotation, the bypass throttle is formed by the control orifices 86 and 89.

A high pressure zone 90 provided in the end face 72 of rotary slide 55 is represented by an annular groove in communication with the pump connection 3. Beyond this there is a first annular throttle gap 91 between the end faces 72 and 73. On the opposite side of the rotary slide 55 there is an intermediate pressure zone 92 in the form of an annular face. The inner circumference is bounded by a second annular throttle gap 93 which opens into the central passage 41 which is at container pressure. If the rotary slide 55 is pushed to the right in FIG. 2 as a result of the pressure acting in the vicinity of the control orifices, the first throttle gap 91 increases and the second throttle gap 43 decreases. As a result, the pressure in the intermediate pressure zone 92 rises and further displacement of the rotary slide 55 is prevented. The rotary slide therefore assumes a position of equilibrium in which it can be turned practically without friction.

A similar high pressure zone 94 and intermediate pressure zone 95 is provided for the motor housing 47 to keep same in a position of equilibrium.

The distributing valve 68 can have a construction such as that known from DE-OS No. 22 40 632 or as described in U.S. Pat. No. 4,533,303 from which further details about the construction of the metering motor and directional valve can also be obtained.

Figure 6:
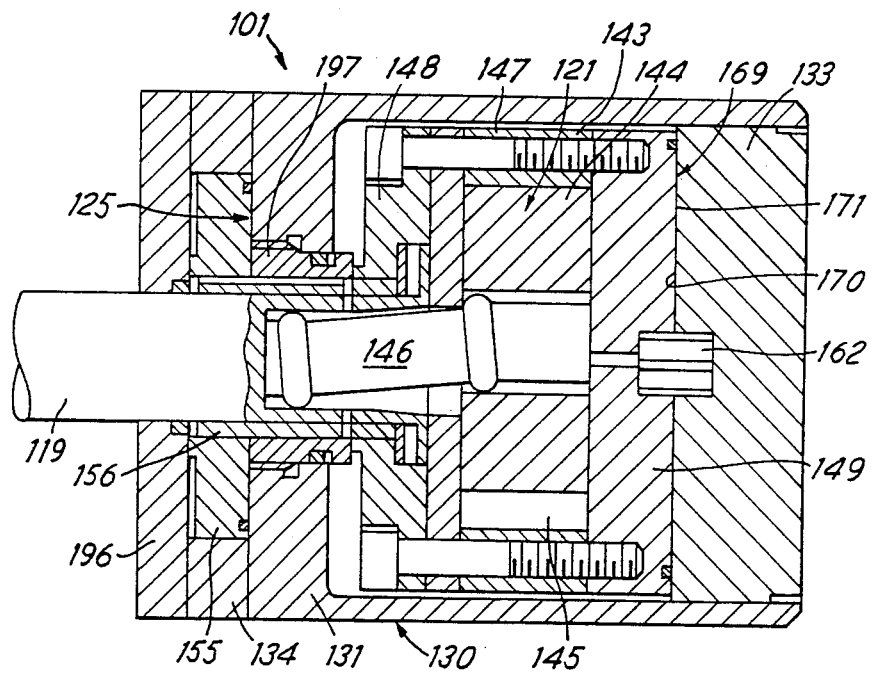
FIG. 6 is a longitudinal section through a different embodiment of the invention.

In the FIG. 6 embodiment, corresponding parts have the same reference numerals as in FIGS. 2 to 5 but increased by 100. In this case, the rotary slide 155 is in the form of an annular disc and disposed between a wall 131 of the outer housing 130 and an additional end wall 196. The entrainment shaft 156 is hollow and the control shaft 119 passes through it. A screw-threaded ring 197 serves to push the motor housing 147 with its end face 170 so far against the end face 171 of wall 133 that just sufficient play remains.

We claim:

1. A hydrostatic steering control device, comprising, a housing having a plurality of ports including fluid inlet and outlet ports and two motor ports connectable to an external servomotor, said housing having first and second transversely extending end wall means and central wall means extending transversely between and in axially spaced relation to said end wall means, a metering motor having a casing rotatably mounted in said housing between said first and central wall means, said casing and one of said wall means forming directional switching valve means for controlling the direction of said servomotor by forming alternate supply and return paths via said fluid inlet and outlet ports and said motor ports, said directional valve means having first engaging valve surfaces therebetween forming a first set of adjustable throttling orifices, said metering motor having an outer member fixed relative to said casing and an inner member movable relative to and cooperable with said outer member to generate a metered fluid flow in said supply path corresponding to the movement of said inner member relative to said outer member, control shaft means for actuating one of said members, one of said metering motor member being connected to said directional valve means to rotate said directional valve means in either turning direction, resilient means for maintaining said directional valve means in a neutral position between two operating positions in the absence of a turning force on said shaft means, a bypass path in said housing between said fluid inlet port and either of said motor ports bypassing said directional valve means and said metering motor, rotary valve means in said bypass path between said housing central wall means and one of said housing end wall means, second engaging valve surfaces between said rotary valve means and one of said wall means forming a second set of adjustable throttling orifices in said bypass path, shaft means between one of said metering motor members and said rotary valve means for rotating said rotary valve means therewith and therby operate all of said adjustable throttling orifices in unison in response to turning of said control shaft means, and pressure regulating means in said bypass upstream of said second set of throttling orifices and responsive to pressure in said bypass and supply paths to maintain constant pressure drops across said throttling orifices in said bypass and supply paths.

2. A hydrostatic steering control device according to claim 1 wherein said control shaft means actuate said metering motor inner member.

3. A hydrostatic steering control device according to claim 1 wherein said central wall means has a central axially extending passage which forms a portion of said return path.

4. A hydrostatic steering control device according to claim 3 wherein said shaft means is connected to said metering motor outer member and extends through said central axially extending passage.

5. A hydrostatic steering control device according to claim 1 wherein said directional valve means surfaces have opposing and adjacent generally rectangularly shaped apertures, means for limiting relative rotation between said directional valve means surfaces, and said resilient means being in said apertures in the form of curved leaf springs.

6. A hydrostatic steering control device according to claim 1 wherein said rotary valve means has a central bore forming a part of said return path, said rotary valve having annular groove means in said second engaging valve surfaces radially outward from said second set of adjustable throttling orifices, passage means connecting said annular groove means to said fluid inlet to provide an annular high pressure zone, first throttle gap means between said second engaging valve surfaces radially outward from said annular groove means, said rotary valve means second throttle gap means on the opposite side thereof from said first throttle gap means to form an intermediate pressure zone radially externally of said second throttle gap means, said high pressure and intermediate pressure zones providing counterbalancing forces for said rotary valve means.

7. A hydrostatic steering control device acccording to claim 1 wherein said control shaft means actuates said metering motor outer member.

8. A hydrostatic steering control device according to claim 4 wherein said shaft means is tubular and surrounds said control shaft means.

* * * * *